United States Patent
Iseki et al.

(10) Patent No.: US 10,264,201 B2
(45) Date of Patent: Apr. 16, 2019

(54) SOLID-STATE IMAGE PICKUP APPARATUS AND IMAGE PICKUP SYSTEM SETTING HORIZONTAL PERIODS FOR READING SIGNALS OF DIFFERENT GROUPS OF HORIZONTAL ROWS

(71) Applicant: CANON KABUSHIKI KAISHA, Tokyo (JP)

(72) Inventors: Masami Iseki, Yokohama (JP); Kazuhiro Sonoda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 15/460,855

(22) Filed: Mar. 16, 2017

(65) Prior Publication Data
US 2017/0289479 A1    Oct. 5, 2017

(30) Foreign Application Priority Data
Mar. 31, 2016 (JP) ................. 2016-070508

(51) Int. Cl.
  *H04N 5/357* (2011.01)
  *H04N 5/376* (2011.01)
  *H04N 5/378* (2011.01)

(52) U.S. Cl.
  CPC ............. *H04N 5/378* (2013.01); *H04N 5/357* (2013.01); *H04N 5/3765* (2013.01)

(58) Field of Classification Search
  CPC ............................. H04N 5/378; H04N 5/357
  See application file for complete search history.

(56) References Cited

U.S. PATENT DOCUMENTS

| | | | |
|---|---|---|---|
| 7,990,448 B2 | 8/2011 | Sonoda | |
| 7,999,866 B2 | 8/2011 | Sonoda | |
| 8,035,712 B2 | 10/2011 | Sonoda | |
| 8,049,799 B2 | 11/2011 | Sonoda | |
| 8,085,324 B2 | 12/2011 | Sonoda | |
| 8,094,220 B2 | 1/2012 | Sonoda | |
| 8,139,132 B2 | 3/2012 | Sonoda | |
| 8,305,473 B2 | 11/2012 | Takenaka | |
| 8,363,137 B2 | 1/2013 | Sonoda | |
| 8,670,058 B2 | 3/2014 | Hayashi | |

(Continued)

FOREIGN PATENT DOCUMENTS

JP  2012-129634    7/2012

OTHER PUBLICATIONS

U.S. Appl. No. 15/457,319, filed Mar. 13, 2017.

*Primary Examiner* — Gevell V Selby
(74) *Attorney, Agent, or Firm* — Venable LLP

(57) ABSTRACT

Provided is a solid-state image pickup apparatus which includes a plurality of groups, each including an output line to which the pixel signals are output from pixels in a corresponding column and an AD conversion unit configured to perform AD conversion on the pixel signals output to the output line for some of the plurality of rows to generate a digital signal. An adjustment period for ensuring a difference in length between a first horizontal period and a second horizontal period and executing an operation of the AD conversion unit is set in a period excluding a period from first timing at which the output of the pixel signals to the output line starts, to second timing at which the AD conversion unit starts the AD conversion.

20 Claims, 11 Drawing Sheets

(56) References Cited

U.S. PATENT DOCUMENTS

| | | | |
|---|---|---|---|
| 8,853,607 B2 | 10/2014 | Sonoda | |
| 9,654,697 B2 | 5/2017 | Takenaka | |
| 2007/0052816 A1* | 3/2007 | Nomura | H04N 5/235 348/226.1 |
| 2009/0190015 A1* | 7/2009 | Bechtel | H04N 5/2355 348/302 |
| 2010/0327176 A1* | 12/2010 | Takenaka | H04N 5/335 250/394 |
| 2011/0267513 A1 | 11/2011 | Sonoda | |
| 2012/0013778 A1 | 1/2012 | Sonoda | |
| 2014/0240563 A1* | 8/2014 | Nakaseko | H04N 5/353 348/296 |
| 2014/0340565 A1* | 11/2014 | Kitani | H04N 5/23212 348/349 |
| 2015/0129744 A1 | 5/2015 | Sonoda | |

* cited by examiner

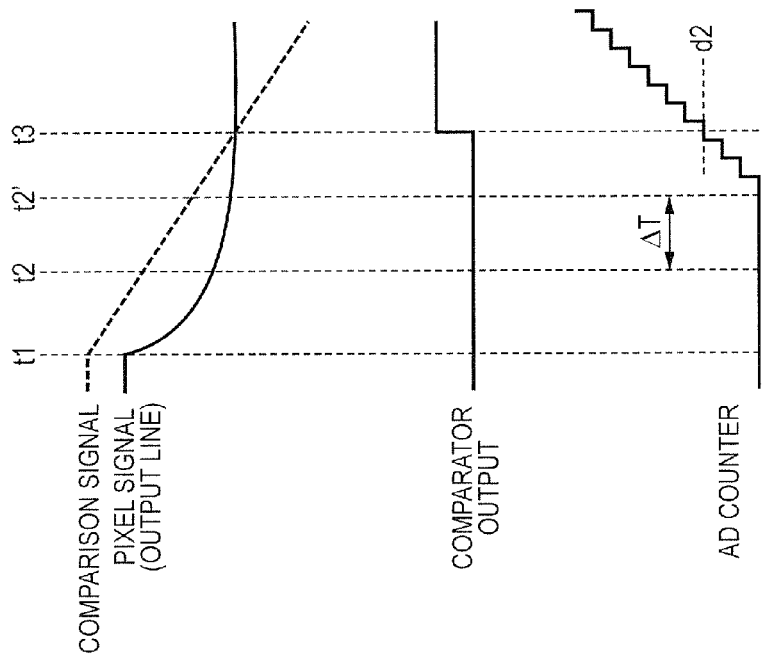
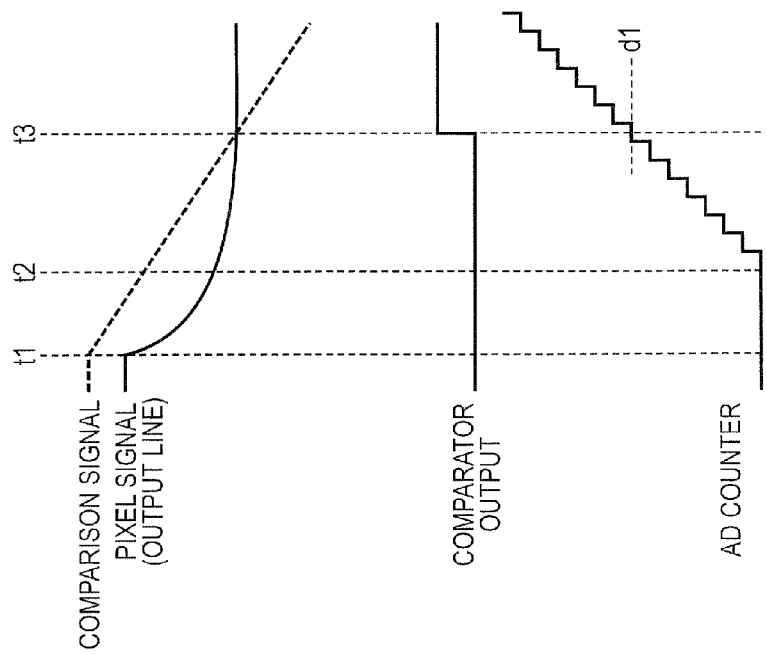

SOLID-STATE IMAGE PICKUP APPARATUS AND IMAGE PICKUP SYSTEM SETTING HORIZONTAL PERIODS FOR READING SIGNALS OF DIFFERENT GROUPS OF HORIZONTAL ROWS

BACKGROUND OF THE INVENTION

Field of the Invention

The present invention relates to a solid-state image pickup apparatus, and more particularly, to a technology of reducing a reading error of a pixel signal.

Description of the Related Art

As one of shutter methods suitable for a solid-state image pickup apparatus using a CMOS image sensor, an electronic shutter method is known. With the electronic shutter method, timing of resetting signal charges, which are photoelectrically converted and accumulated in a photodiode in a pixel, is controlled to achieve variable accumulation time of the signal charges.

With the electronic shutter method, the signal charges in the pixels arranged in a matrix are sequentially reset for each row in synchronization with a horizontal synchronization signal. Then, the signal charges accumulated in each of the pixels are sequentially read for each row after elapse of an accumulation period. A length of the accumulation period is normally the same for each row when a horizontal period corresponding to an interval between the horizontal synchronization signals is constant. When a cycle of a vertical period is not an integer multiple of a cycle of the horizontal synchronization signal, however, an odd period in the vertical period is adjusted in a specific row. As a result, a difference in length of the accumulation period between the rows increases to disadvantageously generate flicker noise or the like.

With a technology described in Japanese Patent Application Laid-Open No. 2012-129634, an interval between the horizontal synchronization signals is adjusted to disperse an odd-period adjustment period within the vertical period so as to prevent the difference in length of the accumulation period between the rows from increasing.

In a solid-state image pickup apparatus, the pixel signal is read based on the charges photoelectrically converted in the pixel, in synchronization with the horizontal synchronization signal. Meanwhile, due to increase in the number of pixels and increase in frame rate of the solid-state image pickup apparatus in recent years, the cycle of the horizontal synchronization signal is shortened. With reduction in the cycle of the horizontal synchronization signal, time required to stabilize the pixel signal output to an output line relatively increases. As a result, there arises a case where a transition is not completed before the start of reading of the pixel signal.

When the interval between the horizontal synchronization signals differs between the rows as in the technology described in Japanese Patent Application Laid-Open No. 2012-129634, a state of convergence of the pixel signal at reading timing differs between the rows. Thus, there is a problem in that a reading error of the pixel signal disadvantageously occurs.

SUMMARY OF THE INVENTION

According to one embodiment of the present invention, there is provided a solid-state image pickup apparatus, including: a pixel unit including a plurality of pixels arranged in a plurality of rows and a plurality of columns, each of the plurality of pixels being configured to output a pixel signal; a plurality of groups, each including an output line to which the pixel signals are output from the pixels in a corresponding one of the plurality of columns and an AD conversion unit configured to perform AD conversion on the pixel signals output to the output line for some of the plurality of rows at each time to generate a digital signal; and a control unit configured to set, as horizontal periods in which the digital signals are sequentially read from the AD conversion units of the plurality of groups, a first horizontal period corresponding to a first group of rows of the plurality of rows and a second horizontal period corresponding to a second group of rows of the plurality of rows, the second horizontal period being longer than the first horizontal period, the control unit being configured to set an adjustment period for ensuring a difference in length between the first horizontal period and the second horizontal period and executing an operation of the AD conversion unit, in a period corresponding to a part of the second horizontal period excluding a period from first timing at which output of the pixel signal to the output line starts, to second timing at which the AD conversion unit starts the AD conversion.

Further, according to another embodiment of the present invention, there is provided a solid-state image pickup apparatus, including: a pixel unit including a plurality of pixels arranged in a plurality of rows and a plurality of columns, each of the plurality of pixels being configured to output a pixel signal; a plurality of groups, each including an output line to which the pixel signals are output from the pixels in a corresponding one of the plurality of columns and an AD conversion unit configured to perform AD conversion on the pixel signals output to the output line for some of the plurality of rows at each time to generate a digital signal; and a control unit configured to set, as horizontal periods in which the digital signals are sequentially read from the AD conversion units of the plurality of groups, a first horizontal period corresponding to a first group of rows of the plurality of rows and a second horizontal period corresponding to a second group of rows of the plurality of rows, the second horizontal period being longer than the first horizontal period, the control unit being configured to set a difference between a length of a period from a time at which the pixel signals of the first group of rows are output from the pixels to the output line until the AD conversion unit starts the AD conversion and a length of a period from a time at which the pixel signals of the second group of rows are output from the pixels to the output line until the AD conversion unit starts the AD conversion smaller than a difference between a length of the first horizontal period and a length of the second horizontal period.

Further features of the present invention will become apparent from the following description of exemplary embodiments with reference to the attached drawings.

BRIEF DESCRIPTION OF THE DRAWINGS

FIG. 12A is a first timing chart for illustrating an operation of an AD conversion unit of an image signal processing unit in a solid-state image pickup apparatus according to a fourth embodiment of the present invention.

FIG. 12B is a second timing chart for illustrating the operation of the AD conversion unit of the image signal processing unit in the solid-state image pickup apparatus according to the fourth embodiment.

DESCRIPTION OF THE EMBODIMENTS

Preferred embodiments of the present invention will now be described in detail in accordance with the accompanying drawings.

(First Embodiment)

Figure 1:
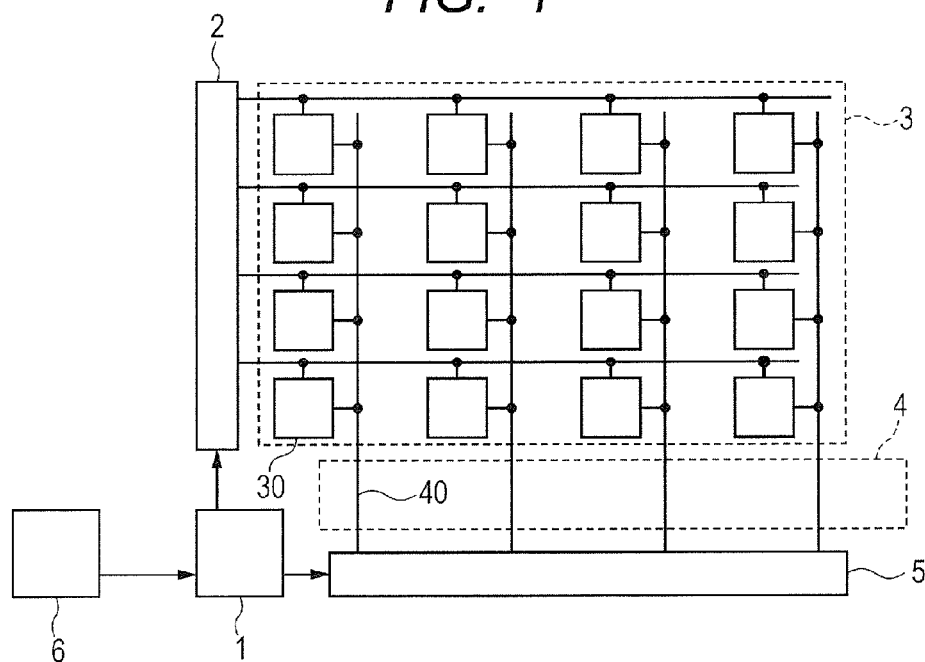
FIG. 1 is a block diagram for illustrating a configuration of a solid-state image pickup apparatus according to a first embodiment of the present invention.

FIG. 1 is a block diagram for illustrating a configuration of a solid-state image pickup apparatus according to a first embodiment of the present invention. The solid-state image pickup apparatus illustrated in FIG. 1 includes a timing generating unit 1, a vertical scanning circuit 2, a pixel unit 3, an output line group 4, a pixel signal processing unit 5, and a synchronization signal generating unit 6.

The pixel unit 3 includes a plurality of pixels arranged in a plurality of rows and a plurality of columns. Each of the pixels 30 is configured to output a pixel signal. A "row direction" used herein indicates a horizontal direction in the drawings, whereas a "column direction" used herein indicates a vertical direction in the drawings. The pixel unit 3 may include an arbitrary number of rows and an arbitrary number of columns of the pixels 30. For simplification of illustration, however, only a limited number of the pixels 30 are illustrated in FIG. 1. Each of the pixels 30 includes a photoelectric conversion element such as a photodiode configured to convert radiated light into a charge, and is configured to output a pixel signal based on retained charges to a column signal line 40 on the same column. The output line group 4 includes a plurality of the column signal lines 40, and is configured to electrically connect the pixel unit 3 and the pixel signal processing unit 5 for each column.

The pixel signal processing unit 5 includes AD conversion units and a comparison signal generating unit (both not shown), and is configured to read the pixel signals output to the output line group 4 for each row. More specifically, the comparison signal generating unit is configured to generate a comparison signal to be referred to for AD conversion of the pixel signals by the AD conversion units, which has a potential changing along with elapse of time. The plurality of AD conversion units are respectively provided to the columns of the pixels. Each of the plurality of AD conversion units includes a column amplifier, a comparator, and an AD counter (all not shown). The column amplifier is configured to amplify the pixel signal output to a corresponding one of the column signal lines 40. The comparator is configured to compare the pixel signal amplified by the column amplifier and the comparison signal output from the comparison signal generating unit. The AD counter is configured to count time until a result of the comparison between the pixel signal and the comparison signal by the comparator is inverted. The pixel signal processing unit 5 is configured to output a read value of the pixel signal based on an AD count value. Here, the column signal lines 40 to which the pixel signals are output from the pixels 30 in corresponding columns and the AD conversion units configured to perform the AD conversion on the pixel signals output to the column signal lines 40 for some of the plurality of rows for each time form a plurality of groups.

The synchronization signal generating unit 6 is configured to output the horizontal synchronization signal having two or more horizontal periods with different lengths. It is hereinafter assumed that there are two types of intervals between the horizontal synchronization signals, which are a first horizontal period and a second horizontal period, for simplification of the description. However, the first embodiment is not limited thereto. The timing generating unit 1 is configured to generate a control signal for driving the pixel unit 3 and the pixel signal processing unit 5, in synchronization with the horizontal synchronization signal. The vertical scanning circuit 2 is configured to output the control signal generated by the timing generating unit 1 to drive the pixel unit 3 for each row. The AD conversion for a first group of rows of the plurality of rows is performed in the first horizontal period, whereas the AD conversion for a second group of rows of the plurality of rows is performed in the second horizontal period. The synchronization signal generating unit 6 may be integrated with the timing generating unit 1. In such a case, the integrated timing generating unit 1 may be configured as a control unit 1' configured to control lengths of the horizontal periods.

Figure 2:
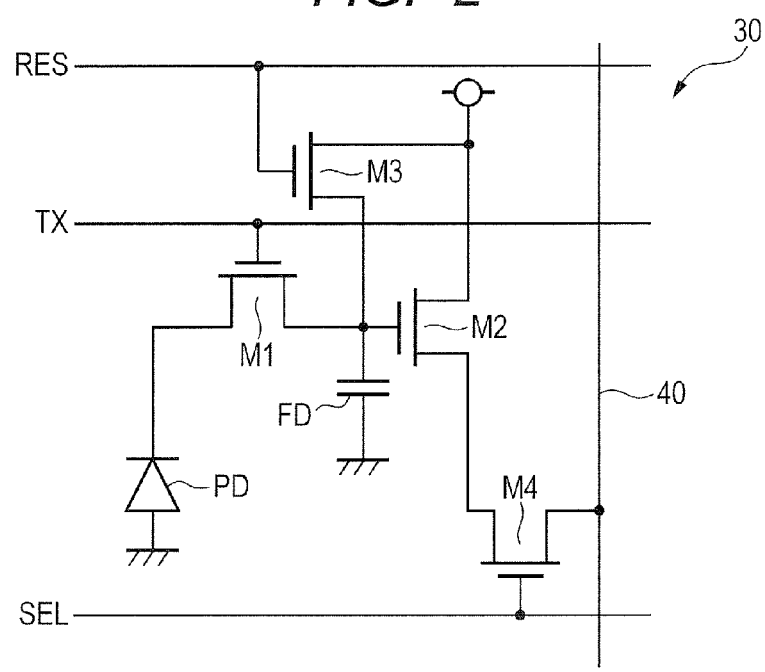
FIG. 2 is an equivalent circuit diagram for illustrating a configuration of a pixel in the solid-state image pickup apparatus according to the first embodiment.

FIG. 2 is an equivalent circuit diagram for illustrating a configuration of the pixel 30 in the solid-state image pickup apparatus according to the first embodiment. The pixel 30 includes a photodiode PD, a transfer transistor M1, an amplification transistor M2, a reset transistor M3, and a selection transistor M4. The transfer transistor M1, the reset transistor M3, and the selection transistor M4 are respectively controlled by control signals TX, RES, and SEL output from the vertical scanning circuit 2. For example, MOS transistors can be used as the above-mentioned transistors.

The photodiode PD is configured to photoelectrically convert radiated light into charges and accumulate the charges. The transfer transistor M1 is controlled by the control signal TX and is configured to transfer the charges accumulated in the photodiode PD to an input node. Here, the "input node" means a floating diffusion region (hereinafter referred to as "FD region") formed at a node between three terminals which are a drain of the transfer transistor M1, a source of the reset transistor M3, and a gate of the amplification transistor M2. In the FD region, the charges transferred from the photodiode PD are retained.

The amplification transistor M2 is configured to output a signal based on the charges retained in the FD region as a pixel signal. The selection transistor M4 is controlled by the control signal SEL and is configured to select the pixel 30 to be connected to the column signal line 40. In this manner, the pixel signal based on the photoelectrically converted charges retained in the FD region of the pixel 30 selected by the selection transistor M4 is output to the column signal line 40. The reset transistor M3 is controlled by the reset signal RES and is configured to reset the charges retained in the FD region.

Figure 3:
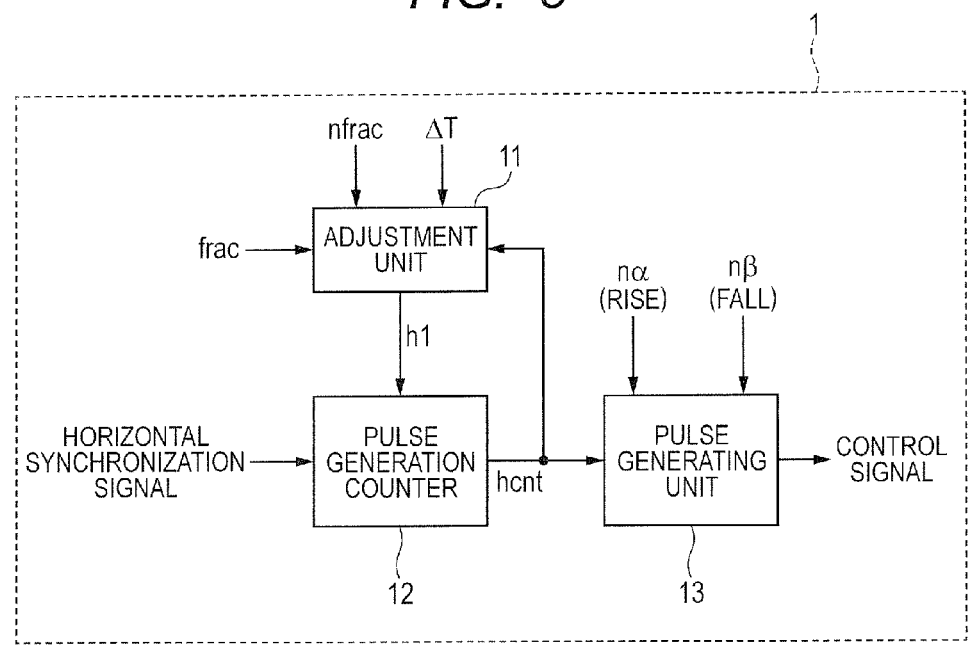
FIG. 3 is a block diagram for illustrating a configuration of a timing generating unit in the solid-state image pickup apparatus according to the first embodiment.

FIG. 3 is a block diagram for illustrating a configuration of the timing generating unit 1 in the solid-state image pickup apparatus according to the first embodiment. The timing generating unit 1 of this embodiment includes an adjustment unit 11, a pulse generation counter 12, and a pulse generating unit 13.

The pulse generation counter 12 is configured to output elapsed time after the start of the horizontal period corresponding to the interval between the horizontal synchronization signals. More specifically, the pulse generation counter 12 counts a reference clock after input of the horizontal synchronization signal to output a count value hcnt. As the reference clock, any clock may be used as long as the clock has a sufficiently short cycle relative to the cycle of the horizontal synchronization signal. The count value hcnt is reset at timing of input of the horizontal synchronization signal. Further, a counting operation of the pulse generation counter 12 is held while a count hold signal h1 is being output from the adjustment unit 11 described later.

The pulse generating unit 13 is configured to generate a control signal for driving at least one of the pixel unit 3 and the pixel signal processing unit 5. More specifically, the pulse generating unit 13 causes the control signal to rise at timing at which the count value hcnt reaches a set value $n\alpha$ and causes the control signal to fall at timing at which the count value hcnt reaches a set value $n\beta$. A plurality of groups of the set values ($n\alpha$, $n\beta$) are sometimes set within one horizontal period. Although an example where the timing generating unit 1 includes the single pulse generating unit 13 is illustrated in FIG. 3, the actual timing generating unit 1 has the same number of pulse generating units 13 as the number of control signals required to drive the pixel unit 3 and the pixel signal processing unit 5.

The adjustment unit 11 is configured to set an adjustment period $\Delta T$ for adjustment of a difference in length of the horizontal period between the rows to the horizontal period to adjust the difference $\Delta T$ between the first horizontal period and the second horizontal period. More specifically, the adjustment unit 11 refers to frac indicating whether or not the horizontal period is a second horizontal period T2. When frac=1, specifically, the horizontal period is the second horizontal period T2, the adjustment unit 11 outputs the count hold signal h1 at timing at which the count value hcnt from the pulse generation counter 12 reaches nfrac, and keeps outputting the count hold signal h1 over the adjustment period $\Delta T$. On the other hand, when frac=0, specifically, the horizontal period is the first horizontal period T1, the adjustment unit 11 does not output the count hold signal h1. As described above, the adjustment unit 11 of this embodiment holds the counting operation performed by the pulse generation counter 12, thereby setting the adjustment period $\Delta T$ within the horizontal period. The timing at which the adjustment unit 11 sets the adjustment period $\Delta T$ can be freely controlled by the set value nfrac.

Figure 4:
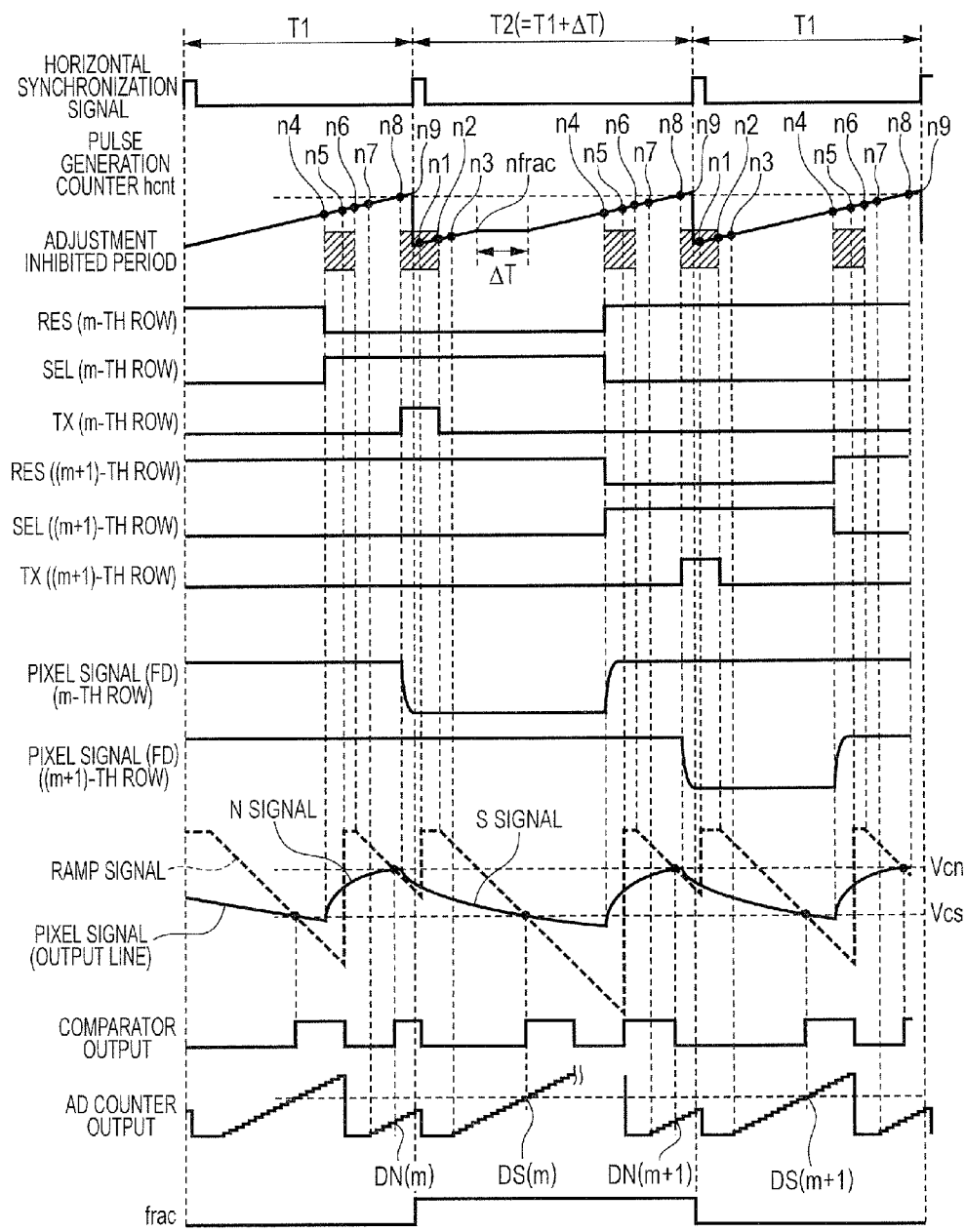
FIG. 4 is a timing chart for illustrating an operation of the solid-state image pickup apparatus according to the first embodiment when an adjustment period for a horizontal period is set out of an adjustment inhibited period.

FIG. 4 is a timing chart for illustrating an operation of the solid-state image pickup apparatus according to the first embodiment when the adjustment period for the horizontal period is set out of an adjustment inhibited period.

A horizontal synchronization signal illustrated in a topmost part of FIG. 4 is output from the synchronization signal generating unit 6. The synchronization signal generating unit 6 of this embodiment outputs the horizontal synchronization signals having two or more horizontal periods with different lengths. In FIG. 4, for simplification of the description, the first horizontal period T1, the second horizontal period T2, and the difference $\Delta T$ between the first horizontal period T1 and the second horizontal period T2 are illustrated in FIG. 4, assuming that the horizontal synchronization signal has two types of intervals, that is, the first horizontal period and the second horizontal period.

The count value hcnt is output by the pulse generation counter 12 of the timing generating unit 1. The adjustment inhibited periods indicated as hatched areas below the count value hcnt are described later in detail. The reset signal RES, the selection signal SEL, and the transfer signal TX are generated by the timing generating unit 1. In FIG. 4, the reset signals RES, the selection signals SEL, and the transfer signals TX for the pixels 30 in the m-th row and the (m+1)-th row are illustrated.

A pixel signal (FD) indicates a level of the signal in the FD region based on the charges retained in the FD region of the pixel 30, whereas a pixel signal (output line) indicates a level of the pixel signal output to the column signal line 40 by switching on the selection transistor M4. As illustrated in FIG. 4, a transition of the pixel signal (output line) has a larger time constant than a transition of the pixel signal (FD) and requires long time to be converged. This is because a capacity of the column signal line 40 used in common by the pixels 30 in the same row is larger than a capacity of the FD region of the pixel 30. In FIG. 4, the pixel signals (FD) for the pixels 30 in the m-th row and the (m+1)-th row are illustrated. In the following description, the "pixel signal" denotes the pixel signal (output line) output to the column signal line 40 unless otherwise clearly indicated with parentheses or the like.

Further, a ramp signal, a comparator output, and an AD counter output in the AD conversion unit of the pixel signal processing unit 5 are illustrated in FIG. 4. The comparator output becomes Low when ramp signal>pixel signal (output line) is satisfied and becomes High when ramp signal<pixel signal (output line) is satisfied. The pixel signal processing unit 5 obtains a read value of the pixel signal based on a value of the AD counter output latched at a rise of the comparator output.

The timing generating unit 1 of this embodiment can freely control the timing at which the adjustment period $\Delta T$ is set within the horizontal period by the set value nfrac. For example, in FIG. 4, a value slightly larger than n3 is set as the set value nfrac, and the adjustment period $\Delta T$ starts at timing at which the count value hcnt reaches nfrac. In the adjustment period $\Delta T$, the generation of the pulse by the pulse generating unit 13 is delayed, thereby adjusting the difference $\Delta T$ between the first horizontal period and the second horizontal period. Now, the timing chart of FIG. 4 is described in time series.

The vertical scanning circuit 2 sets the reset signal RES for the pixels 30 in the m-th row to Low and the selection signal SEL for the same pixels to High at timing at which hcnt reaches n4. As a result, the charges in the FD regions of the pixels 30 in the m-th row are reset. The pixel signal based on the thus reset charges in the FD regions is output to the column signal line 40 as an N signal.

The pixel signal processing unit 5 resets the ramp signal at timing at which hcnt reaches n5. Thereafter, at timing at which hcnt reaches n6, the pixel signal processing unit 5 starts changing the potential of the ramp signal to be compared to the N signal along with elapse of time.

The pixel signal processing unit 5 starts the counting operation performed by the AD counter at timing at which hcnt reaches n7 so as to count time until a magnitude relationship between the ramp signal and the N signal is inverted. As a result, the N signal is obtained based on a count value DN(m) latched at the rise of the comparator output.

The vertical scanning circuit 2 sets the transfer signals TX for the pixels 30 in the m-th row to High at timing at which hcnt reaches n8. As a result, the charges accumulated in the photodiodes PD of the pixels 30 in the m-th row are transferred to the FD regions. The pixel signal based on the transferred charges is output to the column signal line 40 as an S signal.

At timing at which hcnt reaches n9, the horizontal synchronization signal is input, and the count value hcnt of the pulse generation counter 12 is reset.

The pixel signal processing unit 5 resets the ramp signal at timing at which hcnt reaches n1. Thereafter, at timing at which hcnt reaches n2, the pixel signal processing unit 5 starts changing the potential of the ramp signal to be compared to the S signal along with elapse of time.

The pixel signal processing unit 5 starts the counting operation performed by the AD counter at timing at which hcnt reaches n3 so as to count time until a magnitude relationship between the ramp signal and the S signal is inverted. As a result, the S signal is obtained based on a count value DS(m) latched at the rise of the comparator output. Then, from the thus obtained N signal and S signal, the pixel signal whose noise has been corrected is obtained and is output as the read value by the pixel signal processing unit 5.

Here, as described above, the transition of the pixel signal (output line) has a large time constant, and therefore requires long time to be converged. Thus, as illustrated in FIG. 4, the convergence of the transition of the pixel signal is not sometimes completed before the pixel signal processing unit 5 starts reading the pixel signal. In such a case, when timing of starting reading the pixel signal differs between the first horizontal period T1 and the second horizontal period T2, a state of convergence of the pixel signal differs between the rows, leading to a reading error of the pixel signal. The reading error is described later in detail referring to FIG. 5.

Thus, in this embodiment, the adjustment period ΔT is set out of the adjustment inhibited periods from first timing to second timing, which are indicated as the hatched areas in FIG. 4. Here, the first timing is the timing at which hcnt reaches n4, at which the pixel 30 starts outputting the pixel signal to the output line group 4. The second timing is timing of starting the AD conversion, and is the timing at which hcnt reaches n6, at which the pixel signal processing unit 5 starts changing the potential of the ramp signal along with elapse of time.

In the above-mentioned manner, even when the convergence of the transition of the N signal is not completed, a level Vcn at which the magnitude relationship between the ramp signal and the N signal is inverted becomes the same regardless of the presence/absence of the adjustment period ΔT for the horizontal period, as illustrated in FIG. 4. As a result, the reading error of the N signal due to the difference in interval between the horizontal synchronization signals between the rows can be suppressed.

Further, even for the S signal, similarly to the N signal, the adjustment inhibited period is set from the first timing at which hcnt reaches n8, at which the pixel 30 starts outputting the pixel signal to the output line group 4, to the second timing at which hcnt reaches n2, at which the output of the ramp signal starts. The adjustment period ΔT is set out of the adjustment inhibited period.

In the above-mentioned manner, even when the convergence of the transition of the S signal is not completed, a level Vcs at which the magnitude relationship between the ramp signal and the S signal is inverted becomes the same regardless of the presence/absence of the adjustment period ΔT for the horizontal period, as illustrated in FIG. 4. As a result, the reading error of the S signal due to the difference in interval between the horizontal synchronization signals between the rows can be suppressed.

Figure 5:
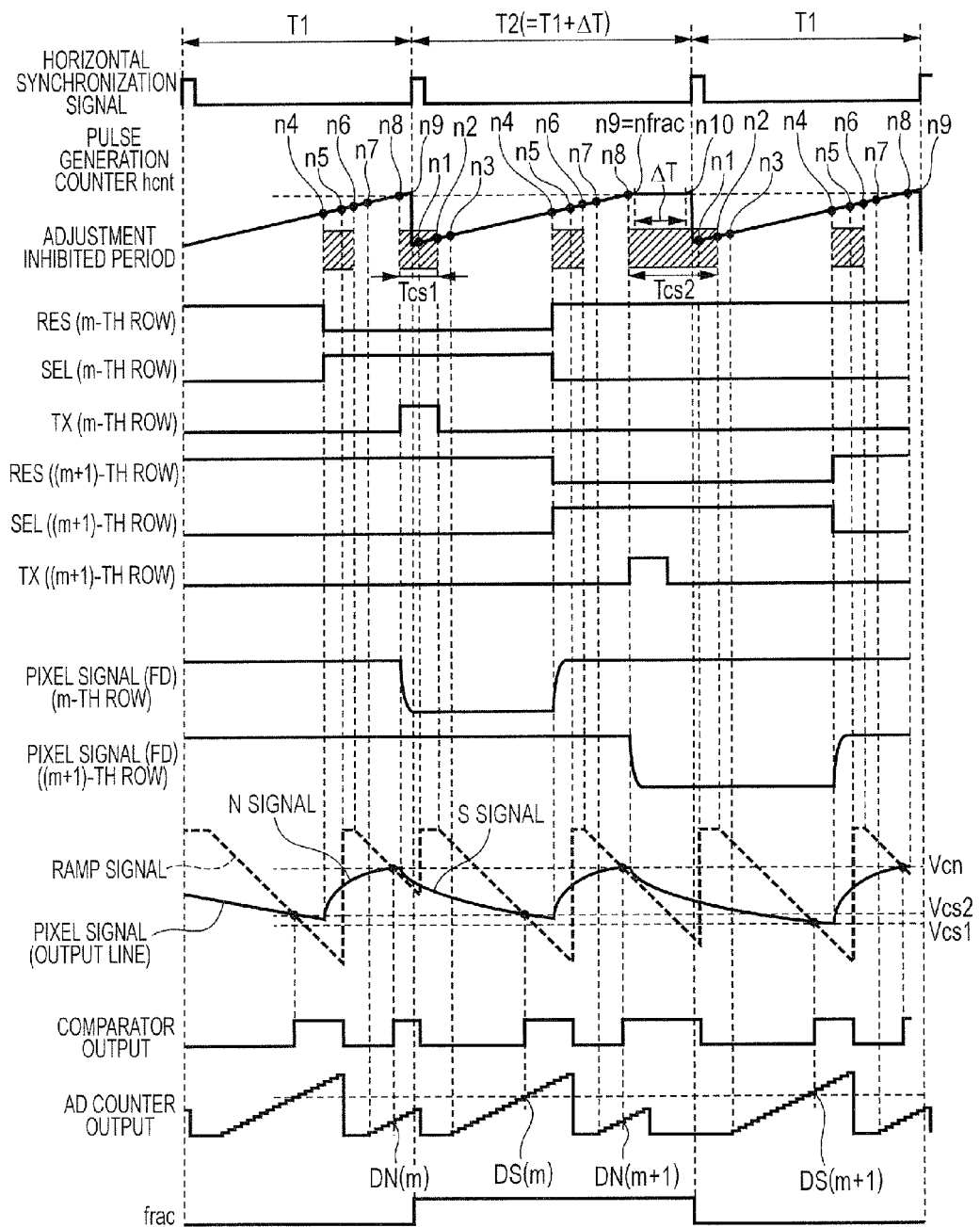
FIG. 5 is a timing chart for illustrating the operation of the solid-state image pickup apparatus according to the first embodiment when the adjustment period for the horizontal period is set within the adjustment inhibited period.

FIG. 5 is a timing chart for illustrating an operation of the solid-state image pickup apparatus according to the first embodiment when the adjustment period ΔT for the horizontal period is set within the adjustment inhibited period. The timing chart of FIG. 5 differs from the timing chart of FIG. 4 in that the adjustment period ΔT for the horizontal period is set within the adjustment inhibited period instead of out of the adjustment inhibited period. The timing chart of FIG. 5 is otherwise the same as that of FIG. 4, and therefore a description thereof is herein omitted.

In FIG. 5, the adjustment period ΔT is set within an adjustment inhibited period Tcs2 that starts during the second horizontal period. On the other hand, in an adjustment inhibited period Tcs1 that starts during the first horizontal period T1, the adjustment period ΔT is not set. A length of the adjustment inhibited period Tcs1 and a length of the adjustment inhibited period Tcs2 are respectively expressed by Expressions (1-1) and (1-2) based on the reference clock counted by the pulse generation counter 12 as a unit. It is noted that a period from the end of the adjustment period ΔT to n10 illustrated in FIG. 5 is short, and therefore is ignored in Expression (1-2).

$$Tcs1 = n9 - n8 + n2 \tag{1-1}$$

$$Tcs2 = n9 - n8 + n2 + \Delta T \tag{1-2}$$

From Expressions (1-1) and (1-2), the length of the adjustment inhibited period Tcs1 and the length of the adjustment inhibited period Tcs2 differ from each other by the adjustment period ΔT. Therefore, the timing n2 at which the change in potential of the ramp signal, which is delayed to the end of the adjustment period ΔT, is delayed.

In particular, when the convergence of the transition of the S signal is not completed before the pixel signal processing unit 5 starts changing the potential of the ramp signal, a level at which the magnitude relationship between the ramp signal and the S signal is inverted differs between the horizontal periods T1 and T2, as indicated by Vcs1 and Vcs2 illustrated in FIG. 5. As a result, the AD counter output latched at the rise of the comparator output differs between the rows, as indicated by DS(m) and DS(m+1) illustrated in FIG. 5. As a result, the reading error of the S signal occurs as DS(m+1)−DS(m).

Similarly, even for the N signal, when the convergence of the transition of the N signal is not completed before the pixel signal processing unit 5 starts changing the potential of the ramp signal, a level at which the magnitude relationship between the ramp signal and the N signal is inverted differs between the first horizontal period T1 and the second horizontal period T2. As a result, the AD counter output latched at the rise of the comparator output differs between the rows, as indicated by DN(m) and DN(m+1) illustrated in FIG. 5. As a result, the reading error of the N signal occurs as DN(m+1)−DN(m).

As described above, it is understood that, when the adjustment period ΔT for the horizontal period is set within the adjustment inhibited period, the reading error of the pixel signal disadvantageously occurs. In this embodiment, however, the adjustment period ΔT is set out of the adjustment inhibited period. Therefore, even when the convergence of the transition of the pixel signal is not completed before the start of reading of the pixel signal, the reading error of the pixel signal due to the difference in interval between the horizontal synchronization signals between the rows can be suppressed. Further, from another point of view, a difference in length of a period from the start of output of the pixel signal to the output line group 4 until the AD conversion unit starts the AD conversion between the first horizontal period and the second horizontal period only needs to be set smaller than a difference in length between the first horizontal period and the second horizontal period. It is more preferred that the first horizontal period and the second horizontal period have the same length of a period from the start of output of the pixel signal from the pixel 30 to the output line group 4 until the AD conversion unit starts the AD conversion. Even in this case, similarly to the case where the adjustment period is set out of the adjustment inhibited period, the reading error of the pixel signal due to the difference in interval between the horizontal synchronization signals between the rows can be suppressed.

Figure 6:
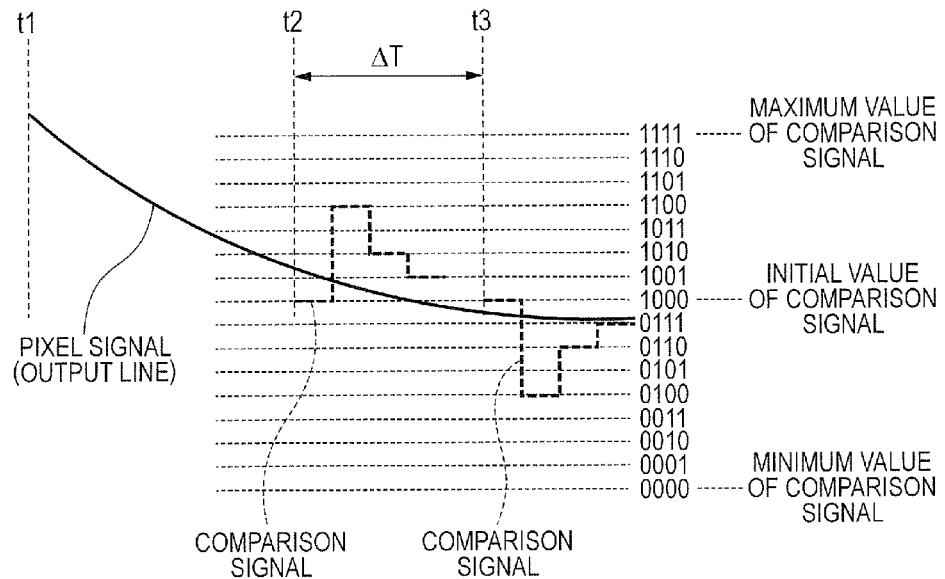
FIG. 6 is a timing chart for illustrating an operation of the solid-state image pickup apparatus according to the first embodiment when pipeline AD conversion is used.

An example of the AD conversion method when the ramp signal is used as the comparison signal is described referring to FIG. 4 and FIG. 5. However, this embodiment is not limited to the AD conversion method described above. For example, the same effects can be obtained even when the pipeline AD conversion or the successive approximation AD conversion is used as the AD conversion method. FIG. 6 is a timing chart for illustrating an operation of the solid-state image pickup apparatus according to the first embodiment when the pipeline AD conversion is used.

In FIG. 6, a 4-bit comparison signal to be compared to the pixel signal (output line) in the pipeline AD conversion is illustrated. A 4-bit pipeline AD conversion unit illustrated in FIG. 6 uses a center value "1000" of an amplitude of the comparison signal as an initial value. At a time t1, the pixel signal is output to the column signal line 40. At a time t2 that is timing of start of the AD conversion, the AD conversion unit compares the pixel signal to a subsequent comparison value "0100" when a relationship: pixel signal<comparison signal is satisfied. On the other hand, when a relationship: pixel signal≥comparison signal is satisfied, the pixel signal is compared to a different subsequent comparison signal "1100". The AD conversion unit sequentially compares the pixel signal in order of higher-order bits in the same procedure, and finally outputs "1000" as an AD conversion value.

On the other hand, when the adjustment period ΔT for the horizontal period is set within the adjustment inhibited period, the pipeline AD conversion starts at a time t3 delayed from the time t2 by the adjustment period ΔT. The AD conversion output in this case is "0111", which is different from the AD conversion output "1000" in a case where the adjustment period ΔT is not set.

As described above, it is understood that, similarly to the case where the ramp signal is used as the comparison signal, even when the pipeline AD conversion is used as the AD conversion method, the reading error of the pixel signal disadvantageously occurs when the adjustment period ΔT for the horizontal period is set within the adjustment inhibited period. In this embodiment, the adjustment period ΔT is set out of the adjustment inhibited period. Therefore, regardless of the AD conversion method to be used, the reading error of the pixel signal due to the difference in interval between the horizontal synchronization signals between the rows can be suppressed.

As described above, in this embodiment, a period from the first timing at which the output of the pixel signal to the output line starts to the second timing at which the AD conversion unit starts the AD conversion is set as the adjustment inhibited period. Further, there is provided the control unit configured to set the adjustment period for ensuring a difference in length between the first horizontal period and the second horizontal period and executing the operation of the AD conversion units, in a period corresponding to a part of the second horizontal period excluding the adjustment inhibited period. In this manner, the reading error of the pixel signal due to the difference in interval between the horizontal synchronization signals between the rows can be suppressed.

In this embodiment, there has been described the method involving adjusting the first horizontal period T1 to the second horizontal period t2 that is longer than the first horizontal period T1 by holding (delaying) the counting operation performed by the pulse generation counter. However, this embodiment is not limited to the method described above. For example, the same effects can be obtained even when the second horizontal period T2 is adjusted to the first horizontal period T1 that is shorter than the second horizontal period T2 by advancing the counting operation performed by the pulse generation counter.

Further, the timing generating unit 1 of this embodiment is not limited to the configuration illustrated in FIG. 3. The timing generating unit 1 only needs to have a configuration for adjusting a difference in horizontal period between the rows out of the adjustment inhibited period by holding the counting operation performed by the pulse generation counter 12.

(Second Embodiment)

Figure 7:
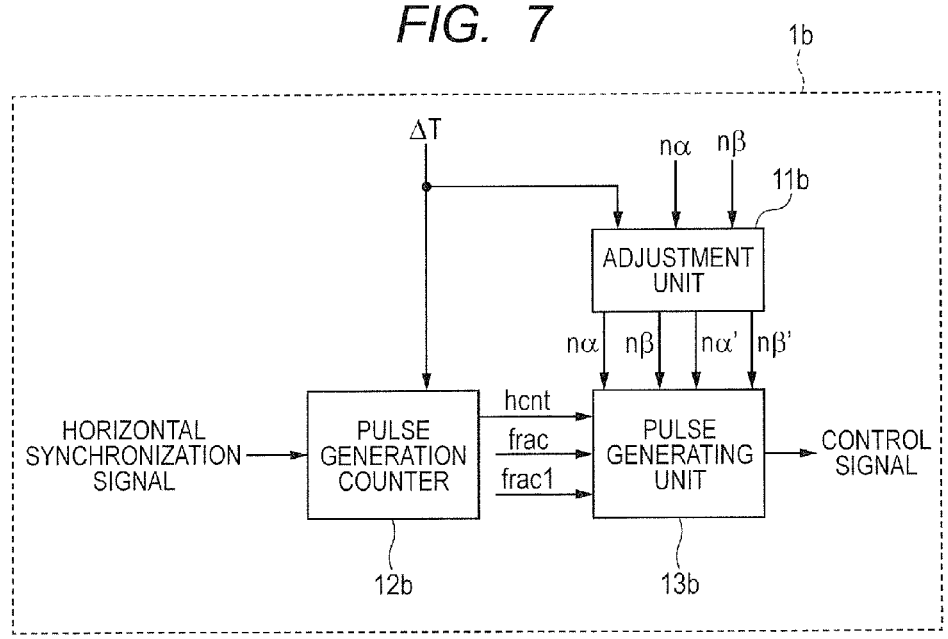
FIG. 7 is a block diagram for illustrating a configuration of a timing generating unit in a solid-state image pickup apparatus according to a second embodiment of the present invention.
Figure 8:
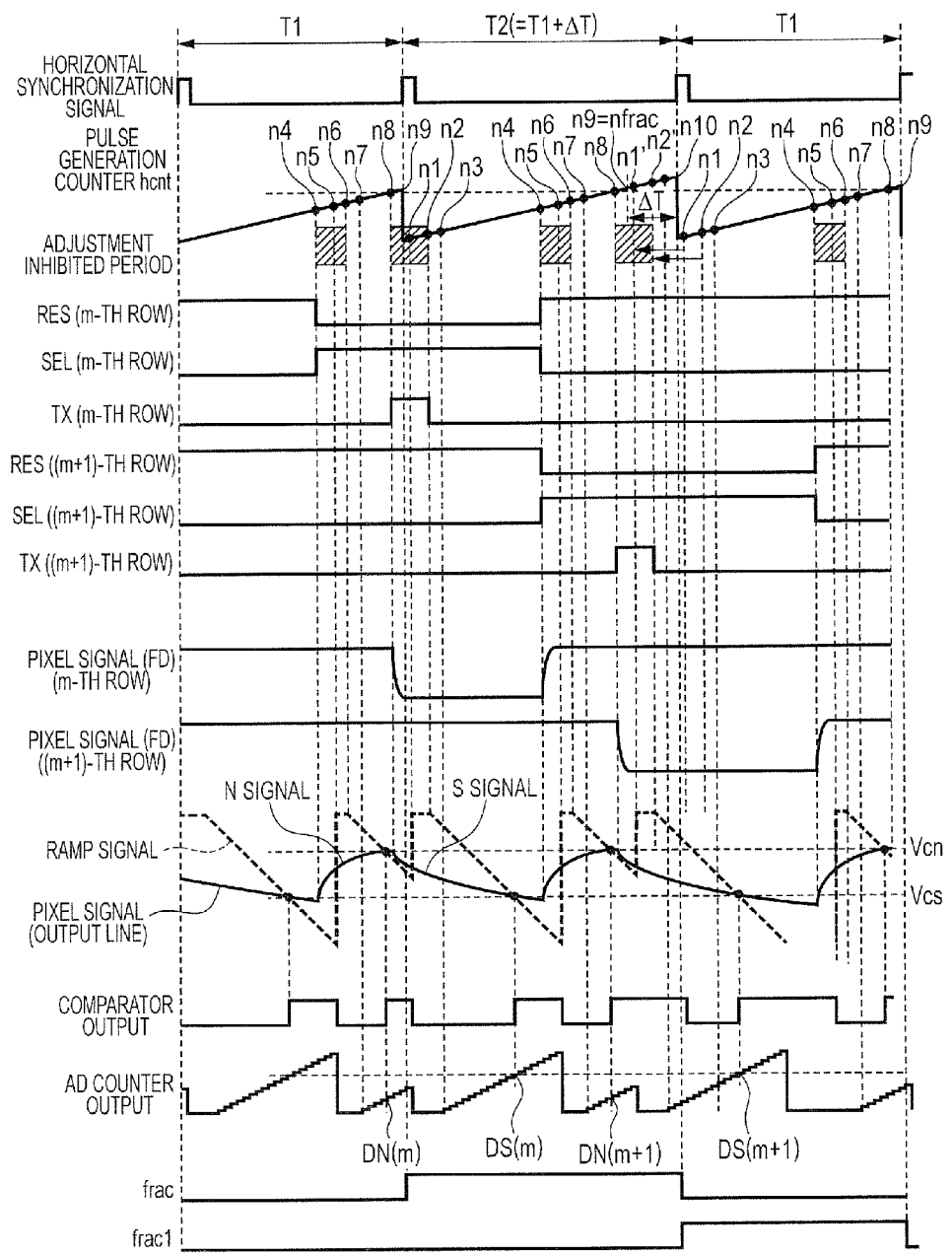
FIG. 8 is a timing chart for illustrating an operation of the solid-state image pickup apparatus according to the second embodiment.

Now, a solid-state image pickup apparatus according to a second embodiment of the present invention is described referring to FIG. 7 and FIG. 8. In the first embodiment, there has been described the method involving adjusting the length of the horizontal period between the rows out of the adjustment inhibited period by holding the counting operation performed by the pulse generation counter. On the other hand, in this embodiment, there is described a method involving adjusting lengths of the adjustment inhibited periods to be equal to each other between the rows by converting set values that define timing of generation of the control signal.

FIG. 7 is a block diagram for illustrating a configuration of a timing generating unit 1b in the solid-state image pickup apparatus according to the second embodiment. The timing generating unit 1b of this embodiment includes an adjustment unit 11b, a pulse generation counter 12b, and a pulse generating unit 13b.

The pulse generation counter 12b is configured to output elapsed time from the start of the horizontal period corresponding to the interval between the horizontal synchronization signals. More specifically, the pulse generation counter 12b counts the reference clock from the input of the horizontal synchronization signal to output the count value hcnt. As the reference clock, any clock may be used as long as the clock has a sufficiently short cycle relative to the cycle of the horizontal synchronization signal. The count value hcnt is reset at timing of input of the horizontal synchronization signal.

The pulse generating unit 13b is configured to generate a control signal for driving at least one of the pixel unit 3 and the pixel signal processing unit 5. More specifically, the adjustment unit 11b first refers to frac indicating whether or not the horizontal period is the second horizontal period T2. In a case where frac is equal to 1, the control signal is caused to rise when the count value hcnt reaches nα' and is caused to fall when the count value hcnt reaches nβ'. On the other hand, in a case where frac is equal to 0, the control signal is caused to rise when the count value hcnt reaches nα and is caused to fall when the count value hcnt reaches nβ. Although details are described later, frac1 that indicates the horizontal period is a horizontal period subsequent to the second horizontal period T2 is referred to in place of frac in some cases. Further, a plurality of the set values (nα, nβ) and (nα', nβ') are sometimes set within a single horizontal period. Further, although an example where the timing generating unit 1b includes the single pulse generating unit 13b is illustrated in FIG. 7, the actual timing generating unit 1b includes the same number of pulse generating units 13b as the number of control signals required to drive the pixel unit 3 and the pixel signal processing unit 5.

The pulse generation counter 12b of this embodiment differs from the pulse generation counter 12 of the first embodiment in that the pulse generation counter 12b does not have a function of holding the counting operation. Therefore, similarly to the case illustrated in FIG. 5, the adjustment period ΔT in this embodiment starts at n9 that is a maximum value of a horizontal counter in a case where the adjustment period ΔT is not set. In FIG. 5, however, the adjustment period ΔT for the horizontal period is set within the adjustment inhibited period as already described above. Therefore, the reading error of the pixel signal disadvantageously occurs.

Therefore, the adjustment unit 11b of this embodiment converts the set values (nα, nβ) that define the timing of generation of the control signal into (nα', nβ') so that the lengths of the adjustment inhibited periods for the horizontal periods become equal to each other between the rows even when the adjustment period ΔT is set within the adjustment inhibited period. More specifically, the adjustment unit 11b subtracts the adjustment period ΔT from some of the set values (nα, nβ) that define timing of rise and timing of fall of the control signal.

FIG. 8 is a timing chart for illustrating an operation of the solid-state image pickup apparatus according to the second embodiment. In the timing chart of FIG. 8, set values n1 and n2 that define the timing of generation of the control signal are converted into n1' and n2' so that the lengths of the adjustment inhibited periods for the horizontal periods become equal to each other between the rows. The timing chart of FIG. 8 is otherwise the same as that of FIG. 5, and therefore a description thereof is herein omitted.

As described above, in FIG. 8, even when the adjustment period ΔT for the horizontal period is set within the adjustment inhibited period, the reading error of the pixel signal due to the difference in interval between the horizontal synchronization signals between the rows can be suppressed because the lengths of the inhibited adjustment periods for the horizontal periods are equal to each other between the rows.

Processing of this embodiment is now exemplified more specifically. The adjustment unit 11b converts the timing n2 of start of a change in potential of the ramp signal, which is the timing of start of the AD conversion, as expressed by Expression (1-3). Here, the adjustment period ΔT in Expression (1-3) is expressed in unit of the reference clock counted by the pulse generation counter 12b.

$$n2'=n2-\Delta T \quad (1\text{-}3)$$

As in the example illustrated in FIG. 8, the set values (nα, nβ) are converted over the horizontal synchronization signals and n2' reaches n2−ΔT<0, the timing n2 is converted into Expression (1-4) in place of Expression (1-3). In Expression (1-4), n9 is the maximum value of the horizontal counter for the first horizontal period T1.

$$n2'=n2+n9 \quad (1\text{-}4)$$

When frac is equal to 1, which indicates that the horizontal period is the second horizontal period T2, the conversion expressed by Expression (1-4) is performed. When frac1 is equal to 1, which indicates that the horizontal period is a horizontal period subsequent to the second horizontal period T2, the conversion expressed by Expression (1-3) is performed.

As described above, the adjustment unit configured to adjust the difference in length of the horizontal period between the rows is provided in this embodiment. Further, the adjustment unit sets a period from the first timing at which the pixel starts outputting the pixel signal to the output line group to the second timing at which the AD conversion unit starts the AD conversion as the adjustment inhibited period, and adjusts the adjustment inhibited periods so that the lengths of the adjustment inhibited periods become equal to each other between the rows. In this manner, the reading error of the pixel signal due to the difference in interval between the horizontal synchronization signals between the rows can be suppressed.

In this embodiment, there has been described the method involving subtracting the adjustment period ΔT from the set values (nα, nβ) that define the timing of the rise and the timing of the fall of the control signal. However, this embodiment is not limited to the method described above. For example, even when the adjustment period ΔT is added to the set values (nα, nβ) that define the timing of the rise and the timing of the fall of the control signal, the same effects can be obtained.

Further, the timing generating unit 1b of this embodiment is not limited to the configuration illustrated in FIG. 7. The timing generating unit 1b only needs to have a configuration for converting the set values that define the timing of generation of the control signal so that the lengths of the adjustment inhibited periods of the horizontal periods become equal to each other between the rows.

(Third Embodiment)

Figure 9:
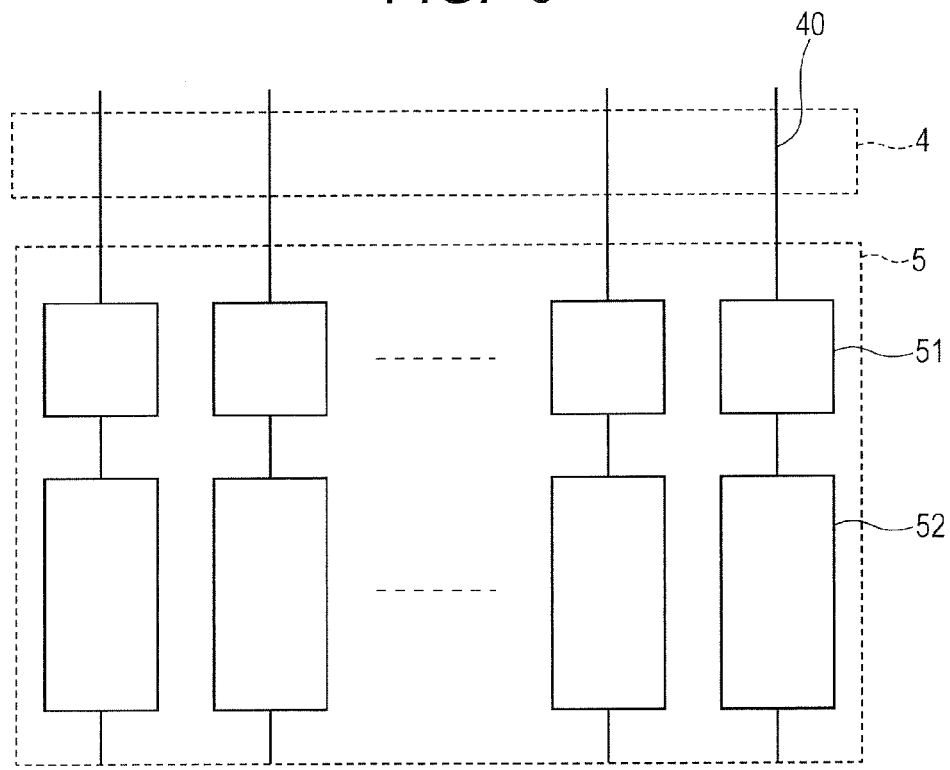
FIG. 9 is a block diagram for illustrating a configuration of a pixel signal processing unit in a solid-state image pickup apparatus according to a third embodiment of the present invention.
Figure 10:
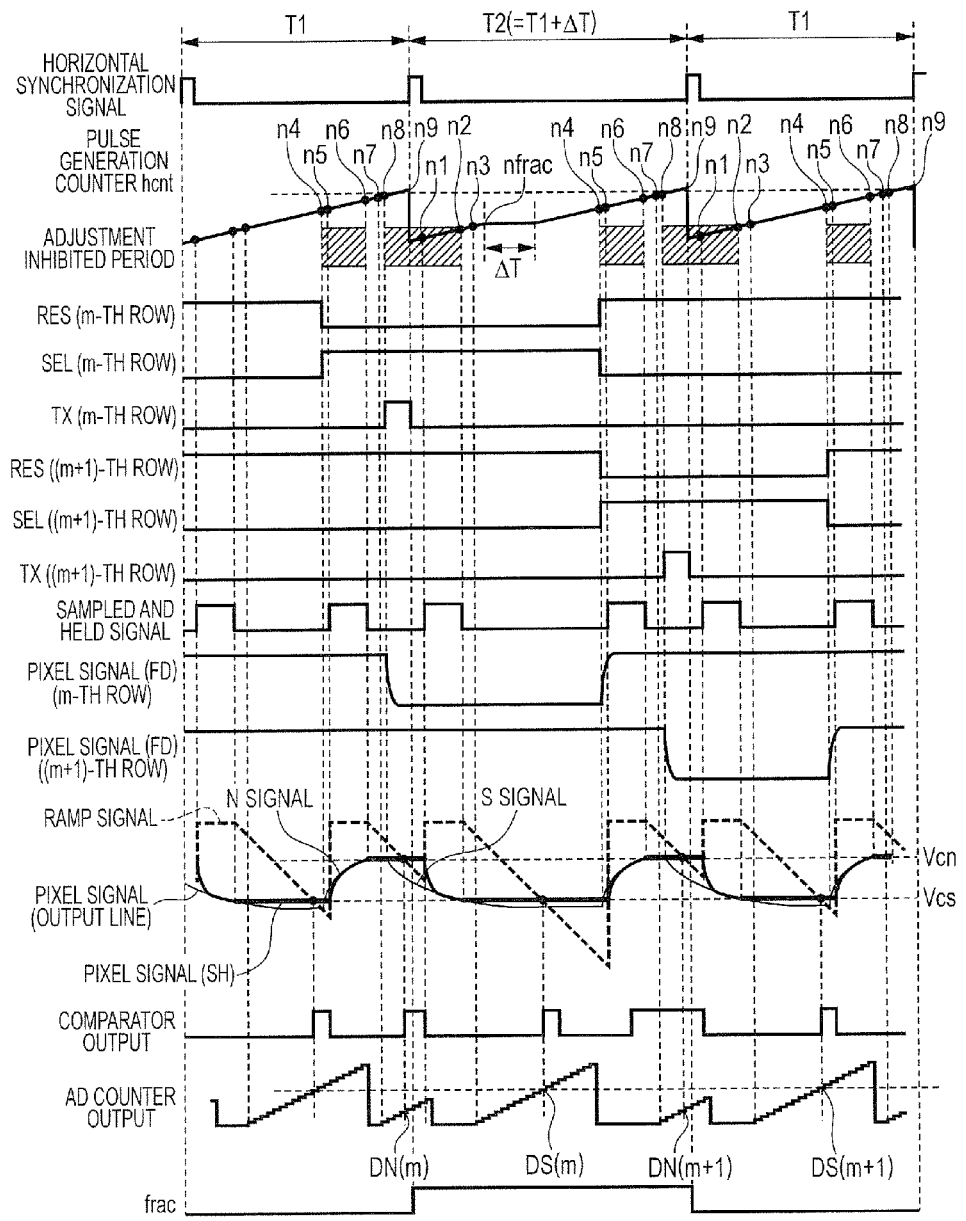
FIG. 10 is a timing chart for illustrating an operation of the solid-state image pickup apparatus according to the third embodiment when the adjustment period for the horizontal period is set out of the adjustment inhibited period.
Figure 11:
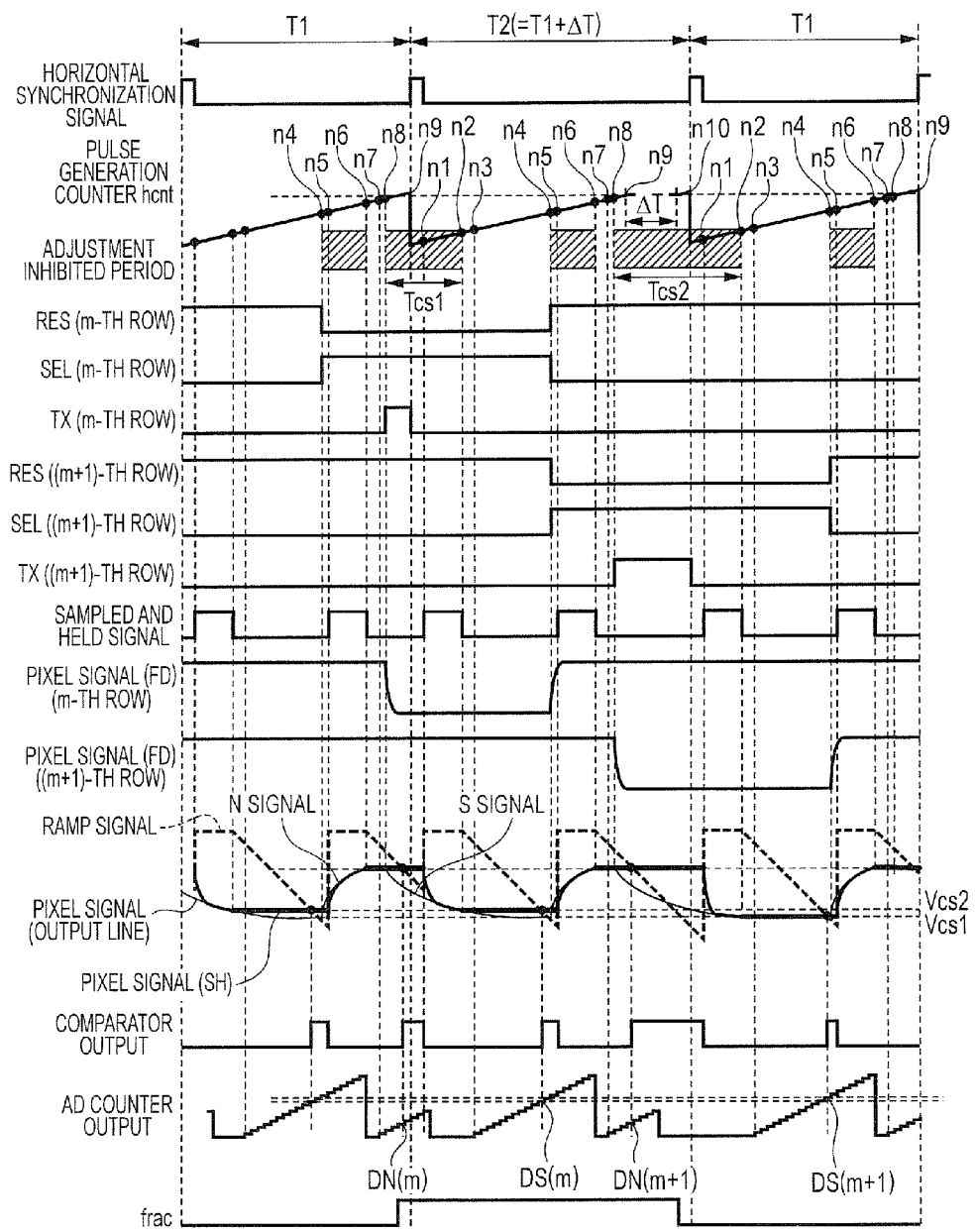
FIG. 11 is a timing chart for illustrating an operation of the solid-state image pickup apparatus according to the third embodiment when the adjustment period for the horizontal period is set within the adjustment inhibited period.

Now, a solid-state image pickup apparatus according to a third embodiment of the present invention is described referring to FIG. 9 to FIG. 11. In this embodiment, there is described a case where the image signal processing unit 5 includes sampling and holding units configured to sample and hold the pixel signals output to the column signal line 40.

FIG. 9 is a block diagram for illustrating a configuration of the pixel signal processing unit 5 of the solid-state image pickup apparatus according to the third embodiment. The pixel signal processing unit 5 of this embodiment includes a plurality of sampling and holding units 51 and a plurality of AD conversion units 52.

Each of the sampling and holding units 51 is configured to sequentially sample and hold the pixel signals output to the column signal line 40. Specifically, after performing a sampling operation for fetching the pixel signal output to the column signal line 40, the sampling and holding unit 51 performs a holding operation for holding the sampled pixel signal. Each of the AD conversion units 52 is configured to perform AD conversion on the pixel signal (SH) held by the sampling and holding unit 51. The column signal lines 40 to which the pixel signals are output from the pixels 30 in corresponding columns and the sampling and holding units 51 configured to sample and hold the pixels signals output to the column signal line 40 for some of the plurality of the rows at each time form a plurality of groups. A sampling and holding operation for a first group of rows of the plurality of rows is performed in the first horizontal period, whereas a sampling and holding operation for a second group of rows of the plurality of rows is performed in the second horizontal period. The synchronization signal generating unit 6 may be integrated with the timing generating unit 1. In this case, the integrated timing generating unit 1 can be configured as the control unit 1' configured to control the length of the horizontal period.

FIG. 10 is a timing chart for illustrating an operation of the solid-state image pickup apparatus according to the third embodiment when the adjustment period for the horizontal period is set out of the adjustment inhibited period. The timing chart of FIG. 10 differs from the timing chart of FIG. 4 in that the pixel signal output to the column signal line 40 is subjected to the AD conversion after being sampled and held instead of being directly subjected to the AD conversion. The timing chart of FIG. 10 is otherwise the same as that of FIG. 4, and therefore a description thereof is herein omitted.

The vertical scanning circuit 2 sets the reset signal RES for the pixels 30 in the m-th row to Low and the selection signal SEL for the same pixels to High at timing at which hcnt reaches n4. As a result, the charges in the FD regions of the pixels 30 in the m-th row are reset. The pixel signal based on the thus reset charges in the FD regions is output to the column signal line 40 as the N signal.

The pixel signal processing unit 5 resets the ramp signal at timing at which hcnt reaches n5. At the same time, the sampling and holding unit 51 starts the sampling of the N signal output to the column signal line 40. Thereafter, simultaneously with the start of change in potential of the ramp signal to be compared to the N signal along with elapse of time at timing at which hcnt reaches n6, the sampling and holding unit 51 holds a value of the N signal.

The pixel signal processing unit 5 starts the counting operation performed by the AD counter at timing at which hcnt reaches n7 so as to count time until a magnitude relationship between the held N signal and the ramp signal is inverted. As a result, the N signal is obtained based on the count value DN(m) latched at the rise of the comparator output.

The vertical scanning circuit 2 sets the transfer signals TX for the pixels 30 in the m-th row to High at timing at which hcnt reaches n8. As a result, the charges accumulated in the photodiodes PD of the pixels 30 in the m-th row are transferred to the FD regions. The pixel signal based on the transferred charges is output to the column signal line 40 as the S signal.

At timing at which hcnt reaches n9, the horizontal synchronization signal is input, and the count value hcnt of the pulse generation counter 12 is reset.

The pixel signal processing unit 5 resets the ramp signal at timing at which hcnt reaches n1. At the same time, the sampling and holding unit 51 starts the sampling of the S signal output to the column signal line 40. Thereafter, simultaneously with the start of change in potential of the ramp signal to be compared to the S signal along with elapse of time at timing at which hcnt reaches n2, the sampling and holding unit 51 holds a value of the S signal.

The pixel signal processing unit 5 starts the counting operation performed by the AD counter at timing at which hcnt reaches n3 so as to count time until a magnitude relationship between the held S signal and the ramp signal is inverted. As a result, the S signal is obtained based on the count value DS(m) latched at the rise of the comparator output. Then, the pixel signal whose noise has been corrected is obtained from the thus obtained N signal and S signal to be output as a read value by the pixel signal processing unit 5.

Here, as in the first embodiment, the transition of the pixel signal (output line) has a large time constant, and therefore requires long time to be converged. Thus, as illustrated in FIG. 10, the convergence of the transition of the pixel signal is not completed before the start of the holding operation of the pixel signal by the sampling and holding unit 51 in some cases. In such a case, when timing of holding the pixel signal differs between the first horizontal period T1 and the second horizontal period T2, the reading error of the pixel signal disadvantageously occurs between the rows.

Therefore, in this embodiment, a period from the first timing at which hnct reaches n4, at which the pixel 30 starts outputting the pixel signal to the output line group 4, to the second timing at which hcnt reaches n6, at which the sampling and holding unit 51 holds the N signal is set as the adjustment inhibited period. Then, the adjustment period ΔT is set out of the adjustment inhibited period. Periods indicated as hatched areas in FIG. 10 are the adjustment inhibited periods.

In the above-mentioned manner, even when the convergence of the transition of the N signal is not completed, the level Vcn at which a magnitude relationship between the held N signal and the ramp signal is inverted becomes the same regardless of the presence/absence of the adjustment period ΔT for the horizontal period, as illustrated in FIG. 10. As a result, the reading error of the N signal due to the difference in interval between the horizontal synchronization signals between the rows can be suppressed.

Further, even for the S signal, similarly to the N signal, a period from the first timing at which hcnt reaches n8, at which the pixel 30 starts outputting the pixel signal to the output line group 4, to the second timing at which hcnt reaches n2, at which the sampling and holding unit 51 holds the S signal, is set as the adjustment inhibited period. Then, the adjustment period ΔT is set out of the adjustment inhibited period.

In the above-mentioned manner, even when the convergence of the transition of the S signal is not completed, the level Vcs at which a magnitude relationship between the held S signal and the ramp signal is inverted becomes the same regardless of the presence/absence of the adjustment period ΔT for the horizontal period, as illustrated in FIG. 10. As a result, the reading error of the S signal due to the difference in interval between the horizontal synchronization signals between the rows can be suppressed. From another point of view, a difference in length of a period from the start of output of the pixel signal to the output line group 4 until the sampling and holding unit 51 holds the pixel signal between the first horizontal period and the second horizontal period only needs to be set smaller than a difference in length between the first horizontal period and the second horizontal period. It is more preferred that the first horizontal period and the second horizontal period have the same length of the period from the start of output of the pixel signal to the output line group 4 until the sampling and holding unit 51 holds the pixel signal. Even in this case, similarly to the case where the adjustment period is set out of the adjustment inhibited period, the reading error of the pixel signal due to the difference in interval between the horizontal synchronization signals between the rows can be suppressed.

FIG. 11 is a timing chart for illustrating an operation of the solid-state image pickup apparatus according to the third embodiment when the adjustment period ΔT for the horizontal period is set within the adjustment inhibited period. The timing chart of FIG. 11 differs from the timing chart of FIG. 10 in that the adjustment period ΔT for the horizontal period is set within the adjustment inhibited period instead of out of the adjustment inhibited period. The timing chart of FIG. 11 is otherwise the same as that of FIG. 10, and therefore a description thereof is herein omitted.

In FIG. 11, the adjustment period ΔT is set within the adjustment inhibited period Tcs2 that starts during the second horizontal period. On the other hand, in the adjustment inhibited period Tcs1 that starts during the first horizontal period T1, the adjustment period ΔT is not set. A length of the adjustment inhibited period Tcs1 and a length of the adjustment inhibited period Tcs2 are respectively expressed by Expressions (2-1) and (2-2) based on the reference clock counted by the pulse generation counter 12 as a unit. It is noted that a period from the end of the adjustment period ΔT to n10 illustrated in FIG. 11 is short, and therefore is ignored in Expression (2-2).

$$Tcs1 = n9 - n8 + n2 \quad (2\text{-}1)$$

$$Tcs2 = n9 - n8 + n2 + \Delta T \quad (2\text{-}2)$$

From Expressions (2-1) and (2-2), the length of the adjustment inhibited period Tcs1 and the length of the adjustment inhibited period Tcs2 differ from each other by the adjustment period ΔT. Therefore, the timing n2 at which holding of the S signal starts, which is delayed to the end of the adjustment period ΔT, is delayed.

In particular, when the convergence of the transition of the S signal is not completed before the S signal is held, the level at which the magnitude relationship between the held S signal and the ramp signal is inverted differs between the rows, as indicated by Vcs1 and Vcs2 illustrated in FIG. 11. As a result, the AD counter output latched at the rise of the comparator output differs between the rows, as indicated by DS(m) and DS(m+1) illustrated in FIG. 11. As a result, the reading error of the S signal occurs as DS(m+1)−DS(m).

Similarly, even for the N signal, when the convergence of the transition of the N signal is not completed before the N signal is held, the level at which the magnitude relationship between the held N signal and the ramp signal is inverted differs between the first horizontal period T1 and the second horizontal period t2. As a result, the AD counter output latched at the rise of the comparator output differs between the rows, as indicated by DN(m) and DN(m+1) illustrated in FIG. 11. As a result, the reading error of the N signal occurs as DN(m+1)−DN(m).

As described above, it is understood that, when the adjustment period ΔT for the horizontal period is set within the adjustment inhibited period, the reading error of the pixel signal disadvantageously occurs. In this embodiment, however, the adjustment period ΔT is set out of the adjustment inhibited period. Therefore, even when the convergence of the transition of the pixel signal is not completed before the pixel signal is held, the reading error of the pixel signal due to the difference in interval between the horizontal synchronization signals between the rows can be suppressed.

As described above, in this embodiment, a period from the first timing at which the output of the pixel signal to the output line starts and the second timing at which the sampling and holding unit samples and holds the pixel signal is set as the adjustment inhibited period. Further, there is provided the control unit configured to set the adjustment period for ensuring a difference in length between the first horizontal period and the second horizontal period and executing the operation of the sampling and holding units, in a period corresponding to a part of the second horizontal period excluding the adjustment inhibited period. In this manner, the reading error of the pixel signal due to the difference in interval between the horizontal synchronization signals between the rows can be suppressed.

Although the example where the pixel signal processing unit 5 includes the AD conversion units 52 is illustrated in FIG. 9, the AD conversion units 52 may be provided outside of the solid-state image pickup apparatus.

(Fourth Embodiment)

Now, a solid-state image pickup apparatus according to a fourth embodiment of the present invention is described referring to FIG. 12A and FIG. 12B. In a method of this embodiment, a period from the start of output of the comparison signal by the pixel signal processing unit 5 to the start of AD counting is additionally set as the adjustment inhibited period.

FIG. 12A and FIG. 12B are timing charts for showing an operation of the AD conversion unit of the pixel signal processing unit 5 of the solid-state image pickup apparatus according to the fourth embodiment. FIG. 12A is a timing chart for illustrating an AD conversion operation when the adjustment period ΔT is not set. On the other hand, FIG. 12B is a timing chart for illustrating an AD conversion operation when the adjustment period ΔT is set.

In FIG. 12A, at a time t1, the comparison signal generating unit starts outputting the comparison signal. At a time t2, the AD counter starts the AD counting. At a time t3, the comparison signal intersects with the pixel signal, and the output of the comparator rises. As a result, in FIG. 12A, an AD counter value d1 is read as the value of the pixel signal.

On the other hand, in FIG. 12B, the adjustment period ΔT starts after the time t1 at which the comparison signal generating unit starts outputting the comparison signal and immediately before the time t2 at which the AD counter starts counting. Hence, the time t2 at which the AD counter starts counting is delayed to a time t2' (=t2+ΔT). As a result, a count value d2 of the AD counter is read as the value of the pixel signal in FIG. 12B.

As described above, even when the adjustment period ΔT is set out of the adjustment inhibited period defined in the first embodiment, an error disadvantageously occurs in the result of AD conversion in a case where the timing t1 at which the output of the comparison signal starts and the timing t2 at which the AD counter starts counting are different from each other. The same applies even to a case where the timing t2 at which the AD counter starts counting is earlier than the timing t1 at which the output of the comparison signal starts.

Therefore, in this embodiment, a later one of the timing at which the comparison signal generating unit starts outputting the comparison signal and the timing at which the AD counter starts counting is set as the second timing. Then, a period from the first timing at which the pixel starts outputting the pixel signal to the output line group to the second timing is set as the adjustment inhibited period. The difference in length of the horizontal period between the rows is adjusted in other periods than the adjustment inhibited period. In this manner, the reading error of the pixel signal due to the difference in interval between the horizontal synchronization signals between the rows can be further suppressed.

(Fifth Embodiment)

The solid-state image pickup apparatus described in each of the embodiments described above is applicable to various image pickup systems. As examples of the image pickup systems, there are a digital still camera, a digital camcorder, a monitoring camera, and the like.

Figure 13:
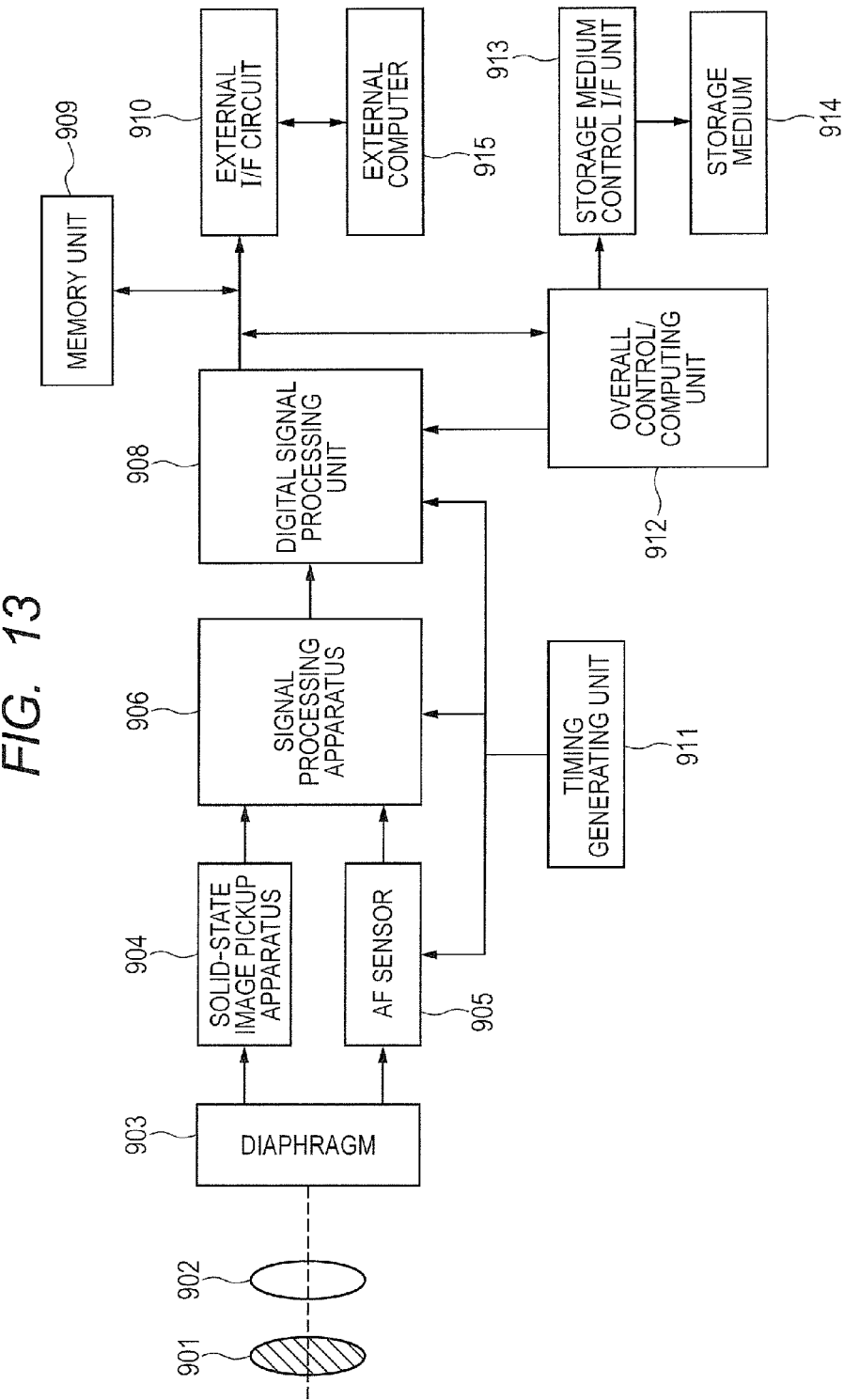
FIG. 13 is a block diagram for illustrating a configuration example of an image pickup system according to a fifth embodiment of the present invention.

FIG. 13 is a block diagram for illustrating a configuration example of an image pickup system according to a fifth embodiment of the present invention. The image pickup system illustrated in FIG. 13 includes a barrier 901, a lens 902, a diaphragm 903, a solid-state image pickup apparatus 904, an AF sensor 905, a signal processing apparatus 906, a digital signal processing unit 908, a memory unit 909, a timing generating unit 911, and an overall control/computing unit 912. Besides, the image pickup system may also include an external I/F circuit 910, a storage medium control I/F unit 913, a storage medium 914, an external computer 915, and the like.

The barrier 901 is configured to protect the lens 902. The lens 902 is configured to form an optical image of an object on the solid image pickup apparatus 904. The diaphragm 903 is configured to adjust the amount of light having passed through the lens 902. The solid image pickup apparatus 904 is the solid image pickup apparatus of the first to fourth embodiments, and is configured to acquire the optical image of the object formed through the lens 902 as an image signal. The AF sensor 905 is configured to acquire focus information for AF processing. The signal processing apparatus 906 is configured to process signals output from the solid image pickup apparatus 904 and the AF sensor 905.

The digital signal processing unit 908 is configured to perform various corrections on image data output from the signal processing apparatus 906 and compress data. The memory unit 909 is configured to temporarily store the image data. The external I/F circuit 910 is configured to perform communication with an external computer and the like. The timing generating unit 911 is configured to output various timing signals to the digital signal processing unit 908 and the like. The overall control/computing unit 912 is configured to perform various computations and control a whole camera. The storage medium control I/F unit 913 is configured to control the storage medium 914. The storage medium 914 is, for example, a semiconductor memory configured to record and read out the acquired image data. The external computer 915 is an external computer configured to transmit the acquired image data.

Next, an operation of the image pickup system illustrated in FIG. 13 during photography is described. After the barrier 901 is opened, the overall control/computing unit 912 computes a distance to the object through phase-difference detection based on the signal output from the AF sensor 905.

Thereafter, the lens 902 is driven based on a result of the computation so that it is determined whether or not the object is in focus again. When it is determined that the object is not in focus, autofocus control for driving the lens 902 again is performed. Subsequently, after it is confirmed that the object is in focus, the solid-state image pickup apparatus 904 takes an image of the object. After the solid-state image pickup apparatus 904 outputs the picked-up image signal, the overall control/computing unit 912 reads the image signal output from the solid-state image pickup apparatus 904 via the signal processing apparatus 906 and the digital signal processing unit 908 to write the image signal in the memory unit 909. Thereafter, the overall control/computing unit 912 records the data accumulated in the memory unit 909 in the storage medium 914 via the storage medium control I/F unit 913. Alternatively, the overall control/computing unit 912 inputs the data to the external computer 915 or the like via the external I/F circuit 910.

As described above, the image pickup system of this embodiment can perform an image pickup operation by using the solid-state image pickup apparatus 904. The image pickup system only needs to include at least the solid-state image pickup apparatus 904 and the signal processing apparatus 906 configured to process the output signal output from the solid-state image pickup apparatus 904.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-070508, filed Mar. 31, 2016, which is hereby incorporated by reference herein in its entirety.

What is claimed is:

1. A solid-state image pickup apparatus, comprising:
a pixel unit including a plurality of pixels arranged in a plurality of rows and a plurality of columns, each of the plurality of pixels being configured to output a pixel signal;
a plurality of groups, each including an output line to which the pixel signals are output from the pixels in a corresponding one of the plurality of columns and an AD conversion unit configured to perform AD conversion on the pixel signals output to the output line for some of the plurality of rows at each time to generate a digital signal; and
a control unit configured to set, as horizontal periods in which the digital signals are sequentially read from the AD conversion units of the plurality of groups, a first horizontal period corresponding to a first group of rows of the plurality of rows and a second horizontal period corresponding to a second group of rows of the plurality of rows, the second horizontal period being longer than the first horizontal period,
the control unit being configured to set an adjustment period for ensuring a difference in length between the first horizontal period and the second horizontal period and executing an operation of the AD conversion unit, in a period corresponding to a part of the second horizontal period excluding a period from first timing at which output of the pixel signal to the output line starts, to second timing at which the AD conversion unit starts the AD conversion.

2. A solid-state image pickup apparatus according to claim 1, further comprising a comparison signal generating unit configured to output a comparison signal having a potential changing along with elapse of time, the comparison signal being referred to for the AD conversion of the pixel signal by the AD conversion unit,
wherein the second timing comprises timing at which the comparison signal generating unit starts changing the potential of the comparison signal along with the elapse of time.

3. A solid-state image pickup apparatus according to claim 1, further comprising a comparison signal generating unit configured to output a comparison signal having a potential changing along with elapse of time, the comparison signal being referred to for the AD conversion of the pixel signal by the AD conversion unit,
wherein the AD conversion unit includes an AD counter configured to perform a counting operation at timing at which the change of the potential of the comparison signal along with the elapse of time starts and timing at which a magnitude relationship between the comparison signal and the pixel signal is inverted, and
wherein the first horizontal period and the second horizontal period has the same period from the start of the change in the potential of the comparison signal along with the elapse of time to start of the counting operation.

4. A solid-state image pickup apparatus according to claim 3, wherein the second timing comprises a later one of the timing at which the comparison signal generating unit starts outputting the comparison signal and timing at which the AD counter starts counting.

5. A solid-state image pickup apparatus according to claim 1, wherein the AD conversion unit is configured to perform the AD conversion on the pixel signal by one of pipeline AD conversion and successive approximation AD conversion.

6. A solid-state image pickup apparatus according to claim 1,
wherein the pixel includes a selection transistor configured to output the pixel signal to the output line, and
wherein the first timing comprises timing at which the selection transistor is switched on.

7. A solid-state image pickup apparatus according to claim 2,
wherein the pixel includes a selection transistor configured to output the pixel signal to the output line, and
wherein the first timing comprises timing at which the selection transistor is switched on.

8. A solid-state image pickup apparatus according to claim 3,
wherein the pixel includes a selection transistor configured to output the pixel signal to the output line, and
wherein the first timing comprises timing at which the selection transistor is switched on.

9. A solid-state image pickup apparatus according to claim 4,
wherein the pixel includes a selection transistor configured to output the pixel signal to the output line, and
wherein the first timing comprises timing at which the selection transistor is switched on.

10. A solid-state image pickup apparatus according to claim 1, wherein the control unit includes a pulse generation counter configured to count elapsed time from start of the horizontal period, and is configured to perform one of delaying and advancing a counting operation performed by the pulse generation counter in the first horizontal period relative to the second horizontal period to generate the adjustment period.

11. A solid-state image pickup apparatus according to claim 2, wherein the control unit includes a pulse generation counter configured to count elapsed time from start of the horizontal period, and is configured to perform one of delaying and advancing a counting operation performed by the pulse generation counter in the first horizontal period relative to the second horizontal period to generate the adjustment period.

12. A solid-state image pickup apparatus according to claim 3, wherein the control unit includes a pulse generation counter configured to count elapsed time from start of the horizontal period, and is configured to perform one of delaying and advancing a counting operation performed by the pulse generation counter in the first horizontal period relative to the second horizontal period to generate the adjustment period.

13. A solid-state image pickup apparatus according to claim 4, wherein the control unit includes a pulse generation counter configured to count elapsed time from start of the horizontal period, and is configured to perform one of delaying and advancing a counting operation performed by the pulse generation counter in the first horizontal period relative to the second horizontal period to generate the adjustment period.

14. A solid-state image pickup apparatus according to claim 5, wherein the control unit includes a pulse generation counter configured to count elapsed time from start of the horizontal period, and is configured to perform one of delaying and advancing a counting operation performed by the pulse generation counter in the first horizontal period relative to the second horizontal period to generate the adjustment period.

15. A solid-state image pickup apparatus, comprising:
a pixel unit including a plurality of pixels arranged in a plurality of rows and a plurality of columns, each of the plurality of pixels being configured to output a pixel signal;
a plurality of groups, each including an output line to which the pixel signals are output from the pixels in a corresponding one of the plurality of columns and a sampling and holding unit configured to sample and hold the pixel signals output to the output line for some of the plurality of rows at each time; and
a control unit configured to set, as horizontal periods in which the sampling and holding units of the plurality of groups sequentially sample and hold the pixel signals, a first horizontal period corresponding to a first group of rows of the plurality of rows and a second horizontal period corresponding to a second group of rows of the plurality of rows, the second horizontal period being longer than the first horizontal period,
the control unit being configured to set an adjustment period for ensuring a difference in length between the first horizontal period and the second horizontal period and executing an operation of the sampling and holding unit, in a period corresponding to a part of the second horizontal period excluding a period from first timing at which output of the pixel signal to the output line starts, to second timing at which the sampling and holding unit holds the pixel signal.

16. A solid-state image pickup apparatus according to claim 15,
wherein the pixel includes a selection transistor configured to output the pixel signal to the output line, and
wherein the first timing comprises timing at which the selection transistor is switched on.

17. A solid-state image pickup apparatus according to claim 15, wherein the control unit includes a pulse generation counter configured to count elapsed time from start of the horizontal period, and is configured to perform one of delaying and advancing a counting operation performed by the pulse generation counter in the first horizontal period relative to the second horizontal period to generate the adjustment period.

18. A solid-state image pickup apparatus, comprising:
a pixel unit including a plurality of pixels arranged in a plurality of rows and a plurality of columns, each of the plurality of pixels being configured to output a pixel signal;
a plurality of groups, each including an output line to which the pixel signals are output from the pixels in a corresponding one of the plurality of columns and an AD conversion unit configured to perform AD conversion on the pixel signals output to the output line for some of the plurality of rows at each time to generate a digital signal; and
a control unit configured to set, as horizontal periods in which the digital signals are sequentially read from the AD conversion units of the plurality of groups, a first horizontal period corresponding to a first group of rows of the plurality of rows and a second horizontal period corresponding to a second group of rows of the plurality of rows, the second horizontal period being longer than the first horizontal period,
the control unit being configured to set a difference between a length of a period from a time at which the pixel signals of the first group of rows are output from the pixels to the output line until the AD conversion unit starts the AD conversion and a length of a period from a time at which the pixel signals of the second group of rows are output from the pixels to the output line until the AD conversion unit starts the AD conversion smaller than a difference between a length of the first horizontal period and a length of the second horizontal period.

19. A solid-state image pickup apparatus, comprising:
a pixel unit including a plurality of pixels arranged in a plurality of rows and a plurality of columns, each of the plurality of pixels being configured to output a pixel signal;
a plurality of groups, each including an output line to which the pixel signals are output from the pixels in a corresponding one of the plurality of columns and a sampling and holding unit configured to sample and hold the pixel signals output to the output line for some of the plurality of rows at each time; and
a control unit configured to set, as horizontal periods in which the sampling and holding units of the plurality of groups sequentially sample and hold the pixel signals, a first horizontal period corresponding to a first group of rows of the plurality of rows and a second horizontal period corresponding to a second group of rows of the plurality of rows, the second horizontal period being longer than the first horizontal period,
the control unit being configured to set a difference between a length of a period from a time at which the pixel signals of the first group of rows are output from the pixels to the output line until the sampling and holding units hold the pixel signals and a length of a period from a time at which the pixel signals of the second group of rows are output from the pixels to the output line until the sampling and holding units hold the pixel signals smaller than a difference between a length of the first horizontal period and a length of the second horizontal period.

20. An image pickup system, comprising:
a solid-state image pickup apparatus; and
a signal processing apparatus configured to process a signal output from the solid-state image pickup apparatus,
the solid-state image pickup apparatus comprising:
a pixel unit including a plurality of pixels arranged in a plurality of rows and a plurality of columns, each of the plurality of pixels being configured to output a pixel signal;
a plurality of groups, each including an output line to which the pixel signals are output from the pixels in a corresponding one of the plurality of columns and an AD conversion unit configured to perform AD conversion on the pixel signals output to the output line for some of the plurality of rows at each time to generate a digital signal; and
a control unit configured to set, as horizontal periods in which the digital signals are sequentially read from the AD conversion units of the plurality of groups, a first horizontal period corresponding to a first group of rows of the plurality of rows and a second horizontal period corresponding to a second group of rows of the plurality of rows, the second horizontal period being longer than the first horizontal period,
the control unit being configured to set an adjustment period for ensuring a difference in length between the first horizontal period and the second horizontal period and executing an operation of the AD conversion unit, in a period corresponding to a part of the second horizontal period excluding a period from first timing at which output of the pixel signal to the output line starts, to second timing at which the AD conversion unit starts the AD conversion.

* * * * *